(12) United States Patent
Erdemir et al.

(10) Patent No.: US 6,255,234 B1
(45) Date of Patent: Jul. 3, 2001

(54) ULTRA LOW FRICTION CARBON/CARBON COMPOSITES FOR EXTREME TEMPERATURE APPLICATIONS

(75) Inventors: Ali Erdemir, Naperville; Donald E. Busch, Hinsdale; George R. Fenske, Downers Grove, all of IL (US); Sam Lee, Gardena, CA (US); Gary Shepherd, Los Alamitos, CA (US); Gary J. Pruett, Cypress, CA (US)

(73) Assignees: Hitco Carbon Composites, Inc., Gardena, CA (US); The University of Chicago, Chicago, IL (US)

(*) Notice: Subject to any disclaimer, the term of this patent is extended or adjusted under 35 U.S.C. 154(b) by 0 days.

(21) Appl. No.: 09/213,551

(22) Filed: Dec. 17, 1998

Related U.S. Application Data (63) Continuation-in-part of application No. 08/791,674, filed on Jan. 30, 1997, now abandoned.

(51) Int. Cl.[7] .................................................. B32B 27/04
(52) U.S. Cl. ..................... 442/97; 442/136; 442/140; 442/148; 442/179; 428/293.4; 523/149; 523/157
(58) Field of Search .................... 428/293.4; 442/97, 442/136, 140, 149, 179; 523/148, 157

(56) References Cited

U.S. PATENT DOCUMENTS

| | | |
|---|---|---|
| 4,339,021 | 7/1982 | Kosuda et al. . |
| 4,874,564 | 10/1989 | Sudani et al. . |
| 5,037,699 | 8/1991 | Ichikawa et al. . |
| 5,667,310 | 9/1997 | Oyagi et al. . |
| 5,744,075 | 4/1998 | Klett et al. . |
| 5,895,716 * | 4/1999 | Fiala et al. .......................... 428/408 |

* cited by examiner

Primary Examiner—Elizabeth M. Cole
(74) Attorney, Agent, or Firm—Renner, Kenner, Greive, Bobak, Taylor & Weber (57) ABSTRACT

A carbon/carbon composite in which a carbon matrix containing a controlled amount of boron or a boron compound is reinforced with carbon fiber exhibits a low coefficient of friction, i.e., on the order of 0.04 to 0.1 at temperatures up to 600° C., which is one of the lowest frictional coefficients for any type of carbonaceous material, including graphite, glassy carbon, diamond, diamond-like carbon and other forms of carbon material. The high degree of slipperiness of the carbon composite renders it particularly adapted for limiting friction and wear at elevated temperatures such as in seals, bearings, shafts, and flexible joints

32 Claims, 7 Drawing Sheets

CC363AG - MAS

ULTRA LOW FRICTION CARBON/CARBON COMPOSITES FOR EXTREME TEMPERATURE APPLICATIONS

CROSS-REFERENCE TO RELATED APPLICATIONS

The present application is a continuation-in-part application of U.S. Ser. No. 08/791,674, filed Jan. 30, 1997, now abandoned.

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

FIELD OF THE INVENTION

This invention relates generally to low friction, wear resistant materials and is particularly directed to a carbon-carbon composite material, and method of preparation therefor, which is characterized by an ultra low coefficient of friction over a wide temperature range, including high temperature regimes.

BACKGROUND OF THE INVENTION

Materials that exhibit low friction are needed in a variety of applications such as bearings, seals and the like. Composites of nickel oxide and calcium fluoride or zinc oxide, stannous oxide and calcium fluoride are currently under investigation for use in low friction applications. These materials have friction coefficients of approximately 0.6 and service lives of only 500 hours. There is therefore a need to develop materials that exhibit the characteristics of a low coefficient or friction, low wear, and high temperature operating capabilities. Conventional materials such as those comprised of carbon generally have good tribological properties at low temperatures, but tend to become easily graphitized and lose their low coefficient of friction at higher temperatures.

Carbon/carbon composites in which a carbon matrix is reinforced with carbon fiber is one form of these conventional carbon materials. The initial use of these materials was in providing thermal barriers in aerospace vehicles. Such applications are based on the very high temperature capability, i.e., at temperatures up to 5400° F. (3000° C.), of these carbon/carbon composites. At the present time, the major use of carbon/carbon composites is in aircraft brakes with approximately 85% of total carbon carbon/composite production targeted toward this market sector. Previously known properties of carbon/carbon composites which make them an ideal candidate for aircraft brakes are: (1) high coefficient of friction (in the range of 0.4–0.5); (2) high temperature capability; and (3) low weight.

The present inventors have developed a novel use and application for modified carbon/carbon composite materials, which makes use of heretofore unknown characteristics of a specialized class of carbon-carbon materials in applications requiring very low friction and very high wear resistance. These characteristics, coupled with the high temperature capability of the carbon/carbon composite, make this material particularly adapted for use in applications such as bearings, seals and virtually any component or element which engages another body in a frictional manner.

OBJECTS AND SUMMARY OF THE INVENTION

Accordingly, it is an object of the present invention to provide a material which affords excellent high temperature lubrication and high wear resistance to sliding surfaces.

It is another object of the present invention to provide a carbon/carbon composite material which exhibits exceptional slipperiness particularly at elevated temperatures making the material particularly adapted for use in seals, bearings, shafts, flexible joints, and in virtually any component which engages and slides or rotates in contact with another component or body.

It is another object of the present invention to provide a material having a lubricating surface with high integrity and which exhibits low friction and wear, good chemical and dimensional stability, and high temperature operating capability.

In one embodiment, this invention contemplates a method for forming a low friction component for use at high temperatures comprising the steps of impregnating a sheet-like carbon fiber reinforcement material with a phenolic resin or pitch; forming a laminated panel with sheets of the impregnated carbon fiber reinforcement material; forming the laminated panel into a component such as a seal, a bearing, a shaft, a flexible joint, or the like; heating the component in an inert atmosphere at an elevated temperature to carbonize the component by converting the phenolic resin or pitch to carbon, wherein the carbonized component is porous and of low density; densifying the carbonized component by depositing carbon in the pores of the component; and heating the densified carbonized component in an inert atmosphere for graphitizing and removing impurities from the component, wherein the component has a coefficient of friction in the range of 0.022 to 0.11, preferably 0.04 to 0.1, and is capable of operating at temperatures greater than 930° F. (500° C.).

The present invention therefore provides a carbon/carbon composite component adapted for high operating temperature use in a frictional operation wherein said component engages and moves relative to a body, wherein said component has a coefficient of friction in a range of about 0.022 to about 0.11 within an operating temperature range of 70° F. to 1000° F.; and wherein said component comprises a pyrolyzed composite of a carbon fiber reinforced densified carbon matrix, having a final fiber volume of from about 30 volume percent to about 70 volume percent, a matrix resin char content of 0 to about 20 volume percent, a matrix carbon black filler content of 0 to about 10 volume percent, a matrix pyrolitic carbon content of from about 5 to about 20 volume percent, and a final density of from about 1.6 to about 2.0 g/cc; wherein said composite contains a controlled amount of at least one of boron and an inorganic boron compound in a range of about 0.1 to about 10 volume percent In one embodiment, the component may be formed by:
  impregnating a carbon fiber reinforcement material with a pre-impregnating mixture containing amounts of resin or pitch, boron or inorganic boron compound, and carbon black, sufficient to provide their respective final component contents;
  shaping laminated sheets of the carbon fiber reinforcement material into a component precursor before or after said impregnating;
  curing the component precursor;
  heating the component precursor in an inert atmosphere or vacuum at an elevated temperature to form a carbonized component by converting the resin or pitch to carbon, wherein the carbonized component is porous and has low density;
  pyrolyzing the component in an inert atmosphere or vacuum at a temperature of about 1800° F. (980° C.) to about 5000° F. (2760° C.); and, densifying the low density component by depositing pyrolytic carbon in the pores of the component before or after said pyrolyzing.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, in which:

DETAILED DESCRIPTION OF PREFERRED EMBODIMENT

Carbon fiber reinforced carbon matrix materials, or carbon/carbon composites, have thermal stability, high resistance to thermal shock due to high thermal conductivity, and low thermal expansion behavior, i.e., low thermal expansion coefficient (or TEC). These materials are also characterized as having high toughness, strength and stiffness in high temperature applications. Carbon/carbon composites may comprise carbon or graphite reinforcements mixed or contacted with matrix precursors to form a "green" composite, which is then carbonized to form the carbon/carbon composite. Carbon/carbon composites may also comprise carbon or graphite reinforcements in which the matrix is introduced fully or in part by chemical vapor infiltration (CVI).

Carbon reinforcements are commercially available from such companies as Amoco, DuPont, Hercules, Celanese and others, and can take the form of fiber, chopped fiber, cloth or fabric, or chopped cloth or fabric which are referred to as molding compounds. Carbon reinforcements may also take the form of continuous filament yarn, chopped yarn, or tape made from continuous filaments and which are referred to as unidirectional arrays of fibers. Yarns may be woven in desired shapes by braiding or by multidirectional weaving. The yarn, cloth and/or tape may be wrapped or wound around a mandrel to form a variety of shapes and reinforcement orientations. The fibers may be wrapped in the dry state or they may be impregnated with the desired matrix precursor prior to wrapping, winding, or stacking to form what is commonly known as a "prepreg." Such prepreg and woven structure reinforcements are commercially available from various sources including Fiberite, Hexcel and Cytec. The carbon fiber reinforcements are prepared from precursors such as polyacrylonitrile (PAN), rayon or pitch. According to a preferred embodiment of the present invention, the reinforcement is in the form of woven cloth.

Matrix precursors which may be used to form carbon/carbon composites according to the present invention include liquid sources such as phenolic resins and pitch, and gaseous sources, including hydrocarbons such as methane, ethane, propane, and the like. Representative phenolics include, but are not limited to, phenolics sold under the commercially available trade designations USP39 and 91LD, such as supplied by Stuart-Ironsides of Willowbrook, Ill.

The carbon/carbon composites of the present invention as described herein, having low friction characteristics particularly at high temperatures, have not heretofore been known. This invention is thus directed to an improvement in carbon/carbon composite materials, namely the inclusion of a controlled amount of boron, which takes advantage of heretofore unknown characteristics of these materials to provide for new uses of carbon/carbon. The discovery of these heretofore unknown low friction, low wear and high operating temperature characteristics has lead to the development of novel frictional components such as seals, bearings, shafts and flexible joints which afford extremely long operating lifetimes from room temperature to very high temperature environments, i.e., in the range of from approximately 480° F. (250° C.) to 1160° F. (630° C.), with minimal maintenance.

The carbon/carbon composites useful in the present invention may be fabricated by a variety of techniques. Conventionally, resin impregnated carbon fibers are autoclaved or press-molded into the desired shape on a tool or in a die. The molded parts are heat-treated in an inert environment to temperatures from approximately 1300° F. (700° C.) to 5250° F. (2900° C.) in order to convert the organic phases to carbon. The carbonized parts are then densified by carbon chemical vapor infiltration or by multiple cycle reimpregnations with resins as described above. Other fabrication methods include hot pressing and the chemical vapor infiltration of dry preforms. Methods of fabrication of carbon/carbon composites which may be used in carrying out some of the steps necessary in the fabrication method of the present invention are described in U.S. Pat. Nos. 3,174,895 and 3,462,289, which are incorporated by reference herein.

Once the general shape of the carbon/carbon composite article is fabricated, the piece can be readily machined to precise tolerances, on the order of about 0.1 mm or less. Further, because of the strength and machinability of carbon/carbon composites, in addition to the shaping possible in the initial fabrication process, carbon/carbon composites can be formed into shapes for components that are not possible with graphite, for example.

After the component has been formed by the densification of the carbonized part, the component is further heat-treated at 4350° F. (2400° C.) to about 5400° F. (3000° C.) in a non-oxidizing or inert atmosphere to ensure graphitization of the structure and to remove any impurities that may have been introduced. The period of time for this procedure is calculated using conventional calculations based upon graphization time/temperature kinetics, taking into account furnace thermal load and mass. The component may be machined, if desired, to precise specifications and tolerances, as discussed above.

Figure 1:
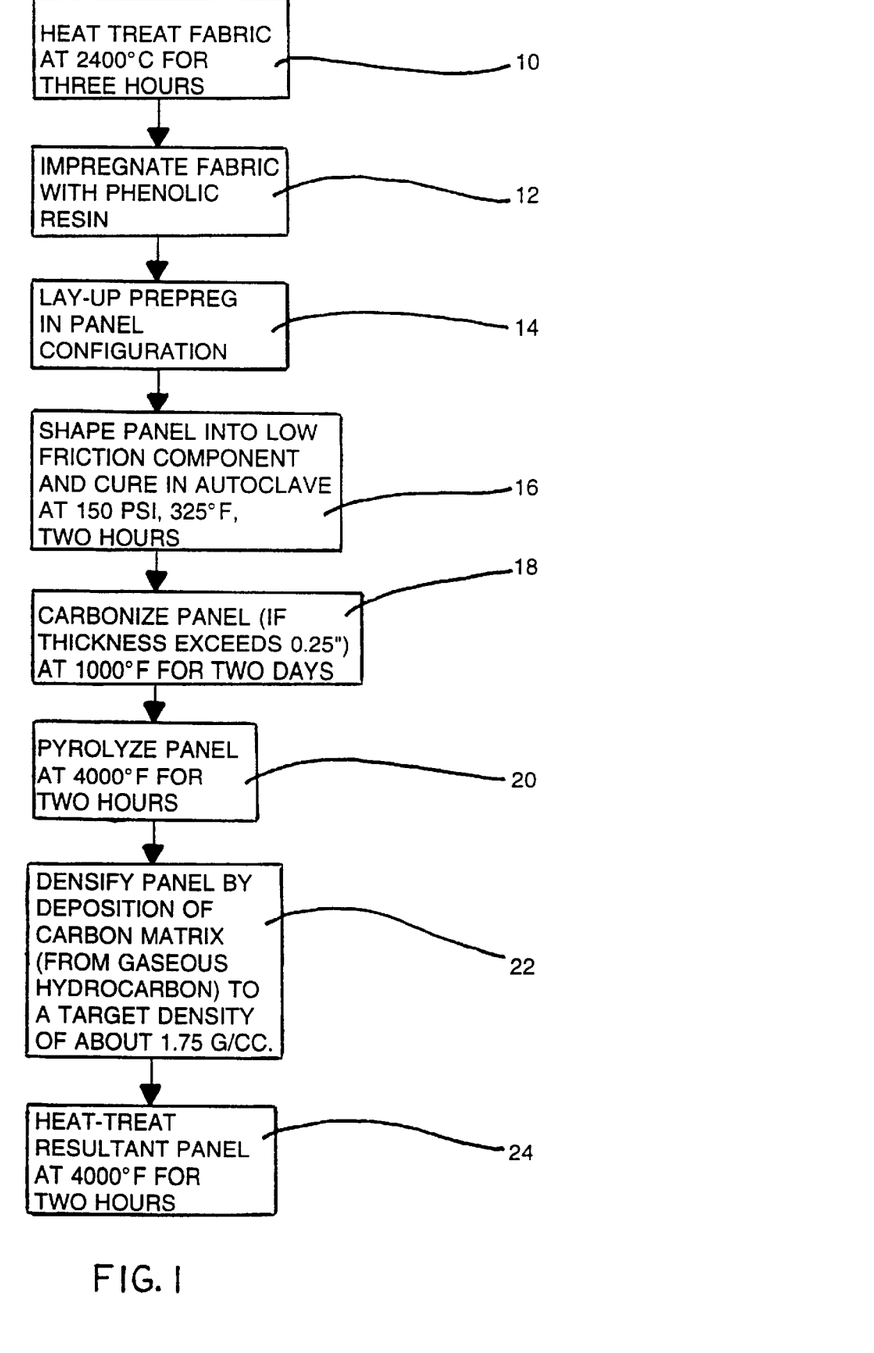
FIG. 1 is a simplified flow chart illustrating the series of steps involved with one embodiment of forming the ultra low friction carbon composite material of the present invention.

Referring to FIG. 1, there is shown a flow chart representing the sequence of steps involved in one embodiment of the manufacture of an ultra low friction carbon composites which are particularly adapted for extreme temperature applications in accordance with the principles of the present invention. In step 10, a carbon reinforcement fabric is heated, for example, at 4350° F. (2400° C.) for three hours. The carbon fiber reinforcement fabric is then impregnated with a desired matrix precursor such as phenolic resin or pitch at step 12 to form a material commonly referred to as a "prepreg." The prepreg carbon fiber reinforcement fabric is then laid-up in a fiber panel configuration by cutting up the prepreg sections and forming the thus cut-up sections into a layered or laminated structure with the carbon fibers aligned in different directions at step 14.

At step 16, the carbon fiber panel is press-molded or formed by means of an autoclave, for example, at a pressure of 150 psi and a temperature of 325° F. (160° C.) for two hours, into a low friction component such as a seal, bearing, shaft or flexible joint having a desired configuration and size, which process also cures the phenolic resin. The cured multi-layer, carbon fiber fabric panel is known as a "green" composite and is termed the "precursor material." At step 18, the multi-layer precursor panel is carbonized, for example, at a temperature of 1000° F. (535° C.) to 1500° F. (815° C.) over two days resulting in the conversion of the phenolic resin into elemental carbon. This carbonization process is carried out either under vacuum or in an inert atmosphere. The resulting precursor panel is porous and of relatively low density.

At step 20, the porous precursor laminate panel is pyrolized in a gaseous hydrocarbon atmosphere, for example, at 4000° F. (2200° C.) for two hours, followed at step 22 by densification of the porous laminate precursor panel by deposition of a carbon matrix to a preferred target density of approximately 1.75 g/cc. The portion of the carbon matrix deposited in the pores of the precursor laminate is derived from an atmosphere of gaseous hydrocarbons such methane, ethane, propane, and the like, including mixtures. In this densification process, the hydrocarbon gas decomposes, or is cracked, for example at a temperature of about 1800° F. (980° C.) to about 2100° F. (1150° C.), to form elemental carbon which is deposited in between the carbon fibers of the porous precursor laminate.

At step 24, the panel is then heat-treated at a high temperature, for example, 4000° F. (2200° C.) for two hours for pyrolizing or graphitizing the laminate composite panel. During this pyrolization or graphitization process, various mechanical properties of the panel, such as its strength and modulus of elasticity, are substantially increased, making the composite material suitable for various high temperature commercial applications.

Table I lists the various constituents, including type and source or supplier, of a preferred embodiment of the carbon composite material of the present invention.

TABLE I

| CONSTITUENT | TYPE | SUPPLIER |
| --- | --- | --- |
| Fiber | PAN Carbon Fiber T-300 | Toray |
| Fabric style | 8-Harness Satin Weave | TPI |
| Phenolic Resin | 134A | Stuart-Ironsides |
| Carbon Black Filler | Cancarb N991 Av. Particle size 270 nm | Canbarb, Ltd. MexicanHat AB, Canada |

TABLE I-continued

| CONSTITUENT | TYPE | SUPPLIER |
| --- | --- | --- |
| Carbon Matrix | From CVI of Gaseous Hydrocarbon | Hitco |

The ultra-low frictional characteristics of the carbon/carbon composites of the present invention are believed to be due to a controlled amount of boron or an inorganic boron compound filler being included in the composite, preferably in the amount of 0.1 to about 10 volume percent, and most preferably about 5 to about 6 volume percent of the composite. Preferably the inorganic boron compound is boron carbide. In a preferred embodiment, the boron carbide is powdered, with a grit size between about 100 and about 5000, most preferably about 1500 grit.

Table II sets forth formulation and process ranges for various parameters involved in the manufacture of the carbon composite material of the present invention.

TABLE II

| CONSTITUENT/ PROCESS | RANGE/TYPES | PRE-FERRED | MORE PRE-FERRED |
| --- | --- | --- | --- |
| Fiber Type | AS4, T300 | | T300 |
| Fabric Weave Style | Plain Weave, twill, 5 harness satin, 8 harness satin | 5HS, 8HS | 8 HS |
| Fiber Volume Fraction | 35–65% | 40–60% | 45–55% |
| Phenolic Resin Type | SC1008, 91LD, 134A | 91LD, 134A | 134A |
| Carbon Black Filler | Various | | Cancarb N991 |
| Resin: Filler Ratio (By Weight) | 100:0–50:50 | 90:10–60:40 | 70:30 |
| Fabric Heat Set Temp./Time | 0.01–100 hrs. 4350° F. (2400° C.) | 1–4 hrs. | 2400° C./ 3hrs. |
| Composite Fabrication | Pressure = 100–200 psi Time = 3 hrs. Temperature = 300–400° F. (150–200° C.) | | 150 psi 2 hours 325° F. (160° C.) |
| Pyrolysis | 3000–4500° F. (1650–2500° C.) | | 4000° F. (2200° C.) |
| C/C Target Density | 1.6–2.0 g/cc | 1.7–1.9 | 1.7–1.75 |
| Heat Treat | 3200–4500° F. (1760–2500° C.) | | 4000° F. (2200° C.) |

Following is a detailed description of the preferred method of making the ultra low friction carbon fiber reinforced carbon matrix material composite of the present invention. A carbon fiber, comprising any commercial carbon fiber derived from either synthetic polymer or pitch precursors, but preferably a fiber from a polyacrylonitrile precursor fiber such as Amoco T-300 with 3000 fibers per yarn tow, is provided in the form of a woven cloth or chopped fiber, preferably a cloth or fabric woven in an 8 harness satin weave, and is heatset to a temperature between about 1500° F. (815° C.) and about 5000° F. (2760° C.), most preferably about 4350° F. (2400° C.). To the fiber is added a controlled amount of boron, preferably in the form of powdered boron carbide ($B_4C$) with a grit size between about 100 and about 5000, most preferably about 1500 grit, sufficient to achieve a volume percent in a range of about 0.1 to about 10, preferably in the range of about 5 to about 6 volume percent, and a resin or pitch material, preferably a resin such as 134A from Stuart-Ironsides or the like, sufficient to achieve a range of resin char after processing of from 0 to about 20 volume percent, preferably between about 11 to about 13 volume percent.

Optionally, an additional amount of carbon black filler, such as that designated by the trade name CanCarb N991 from Canadian Carbon, or the like, is added in an amount sufficient to constitute from 0 to about 10 volume percent, preferably from 6 to 8 volume percent, of the final composite. The addition of the non-fibrous materials can be accomplished either before or after the fibers are arranged in a desired preform shape, but preferably before, by pre-impregnating the fiber tow or cloth with a mixture of isopropyl alcohol or the like and the appropriate amounts of resin, boron carbide and carbon black. The mixture preferably has a viscosity suitable for impregnation of the fiber tow or cloth which results in a uniform dispersion of the mixture throughout the fiber form.

The impregnated fiber form, containing the added non-fiberous material, is compressed and cured in the desired shape to achieve a final fiber volume percent of from about 30 to about 70 percent, preferably between about 45 to about 55 volume percent. The cured precursor is carbonized in an inert surroundings (inert gas such as nitrogen, or a vacuum) to a temperature of between about 800° F. (425° C.) and about 1500° F. (815° C.), most preferably about 1000° F. (535° C.), to convert the organic material to elemental carbon. The carbonized component is, thereafter pyrolyzed or (graphitized) in an inert surrounding, most preferably at about 3200° F. (1760° C.). The carbonized or pyrolyzed component is processed by the addition of pyrolytic carbon using chemical vapor infiltration of hydrocarbon gases (methane, ethane, propane, and the like and mixtures thereof) under conditions sufficient to achieve a final density of preferably from about 1.6 to about 1.9 g/cc, most preferably about 1.7 to about 1.75 g/cc, achieving a final pyrolytic carbon content of from about 5 to about 20 volume percent, most preferably between about 13 to about 15 volume percent.

Table III sets forth various properties and characteristics including ranges of values exhibited by the carbon composite material of the present invention following testing.

TABLE III

| PROPERTY | UNITS | PREFERRED RANGE | MORE PREFERRED RANGE |
|---|---|---|---|
| Tensile Strength | ksi | 35–70 | 49–61 |
| Tensile Modulus | msi | 3.5–16 | 12–15 |
| Compressive Strength | ksi | 11–40 | 26–35 |
| Flexural strength | ksi | 16–50 | 35–46 |
| Fracture Toughness (Izod) | ft.lb./in. | 5–25 | 10–15 |
| CTE-in-plane | mm/m/° F. | | 0–2 |
| CTE-Cross Ply | | | 6–10 |
| Thermal Conductivity in-plane | W/mK | 20–500 | 100 |
| Thermal Emissivity | | | 0.4–0.8 |
| Electrical Resistivity Experimental: | ohm/cm | | $1 \times 10^{-4}$–$1 \times 10^{-2}$ |

Figure 2:
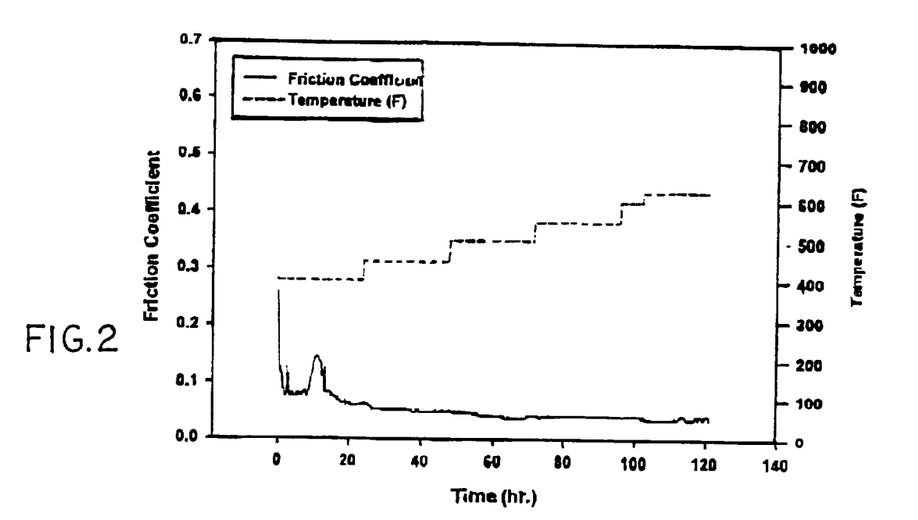
FIG. 2 is a graphic representation of the variation of the coefficient of friction with temperature of the ultra low friction carbon composite material of the present invention over a temperature range of approximately room temperature to 650° F. (340° C.).
Figure 3:
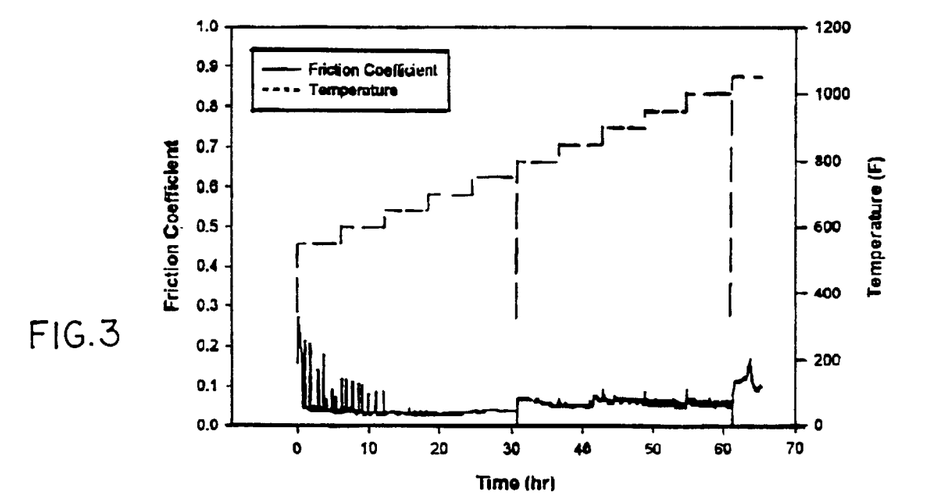
FIG. 3 is a graphic representation of the variation of the coefficient of friction with temperature of the ultra low friction composite material of the present invention over a temperature range of approximately room temperature to 1050° F. (565° C.).
Figure 4:
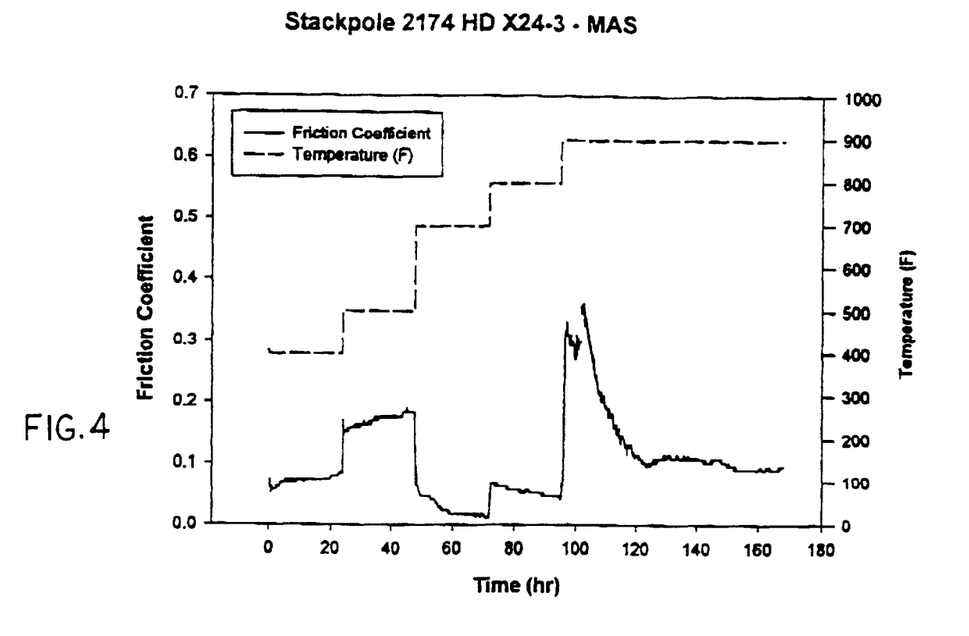
FIGS. 4–12 are graphic representations of the variation of the coefficient of friction with temperature of various other carbon composite materials tested under conditions identical to those under which the ultra low friction carbon composite material of the present invention was test, these latter materials including Stackpole 2174 HDx24-3-MAS (FIG. 4); PMR-11-MAS (FIG. 5); PMR-15-MAS (FIG. 6); CC357E-MAS (FIG. 7); CC363AG-MAS (FIG. 8); JP932 (FIG. 9); JP933-MAS (FIG. 10); JP932 w/2174 Treatment (FIG. 11); JP932 w/2174 Treatment (FIG. 12), respectively.
Figure 5:
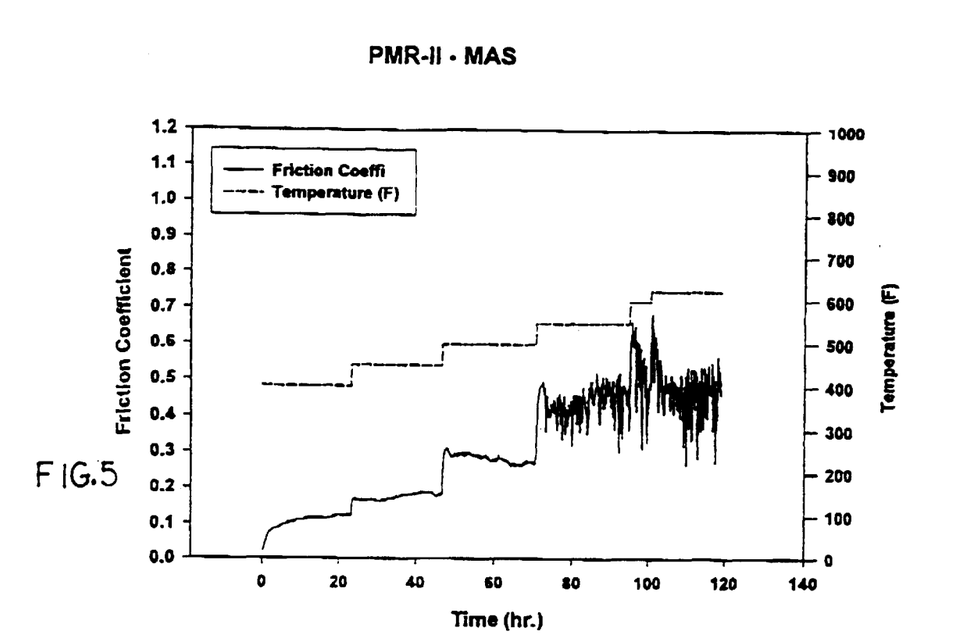
Figure 6:
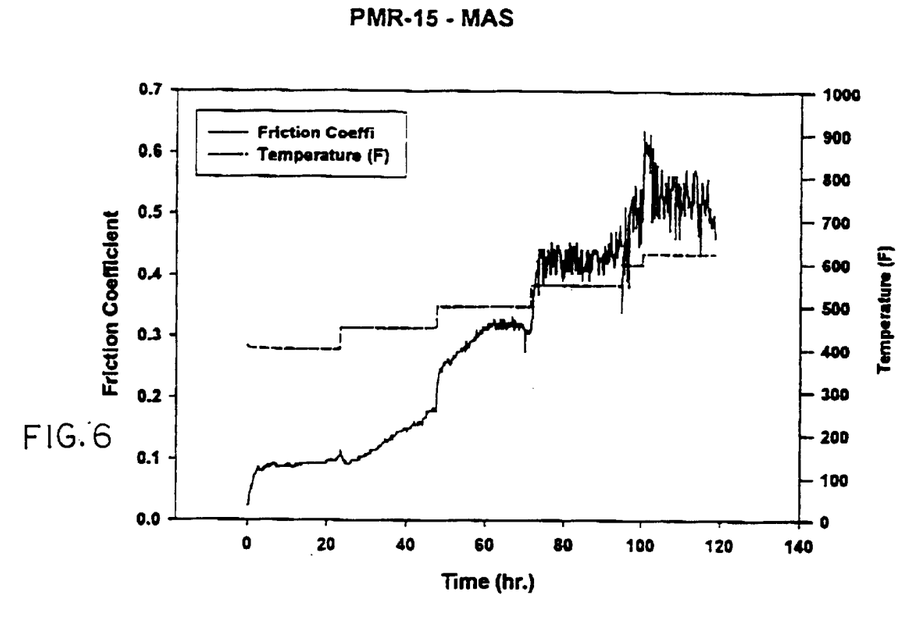
Figure 7:
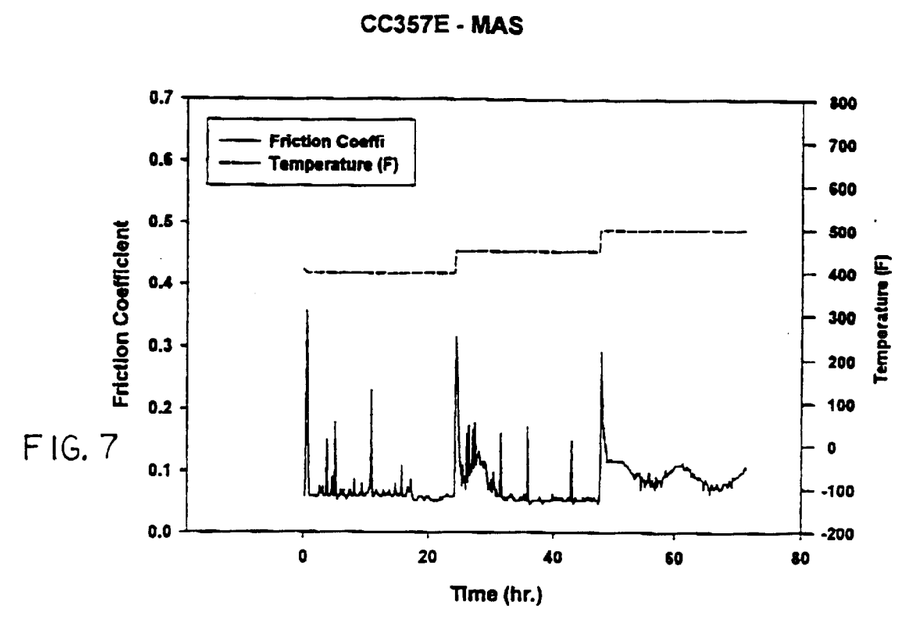
Figure 8:
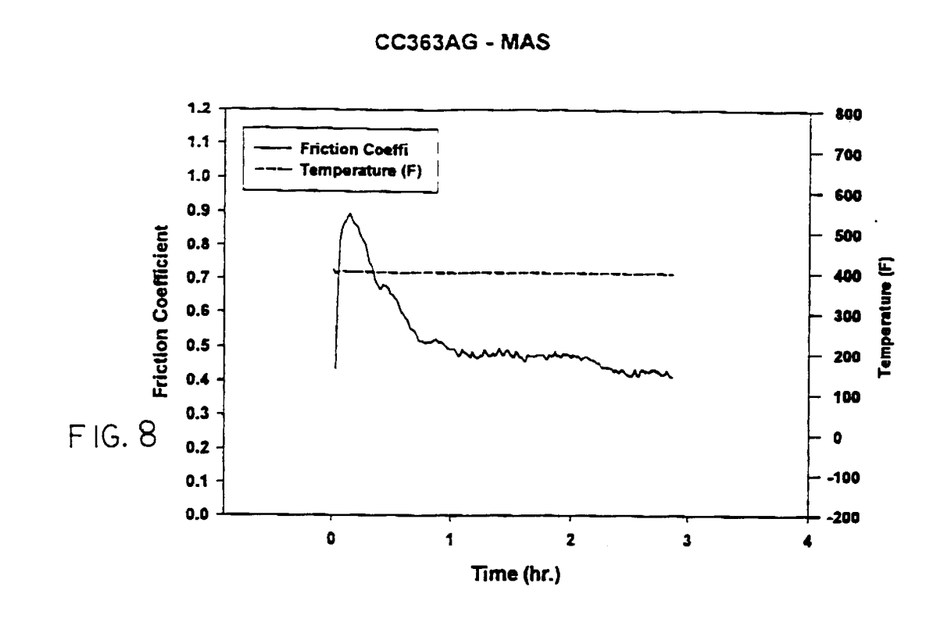
Figure 9:
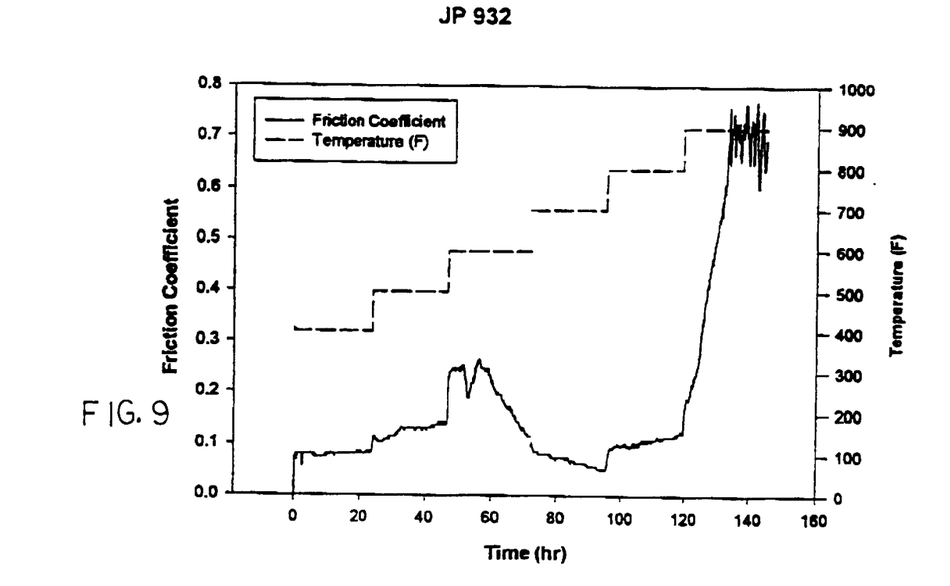
Figure 10:
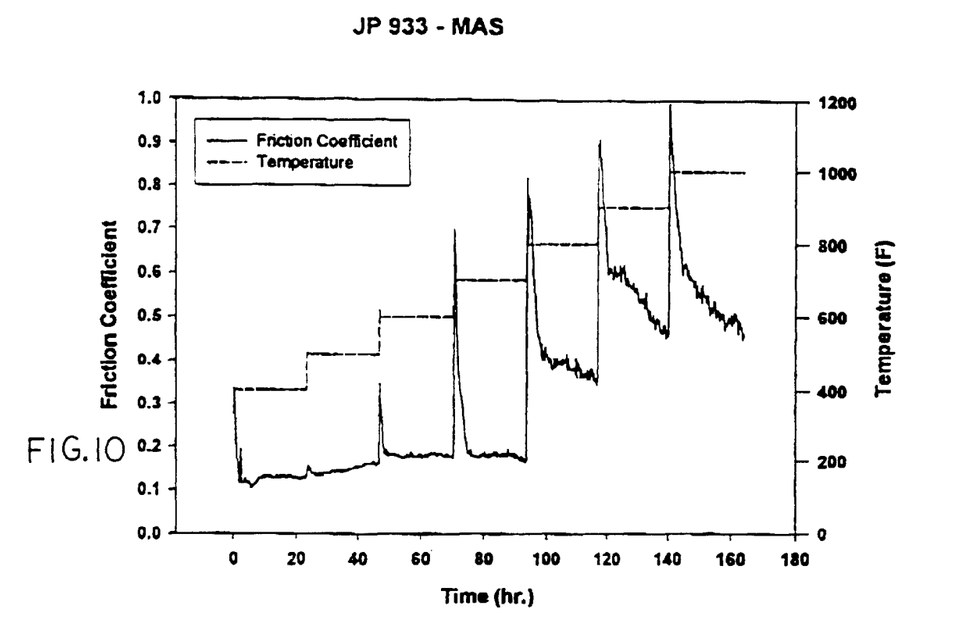
Figure 11:
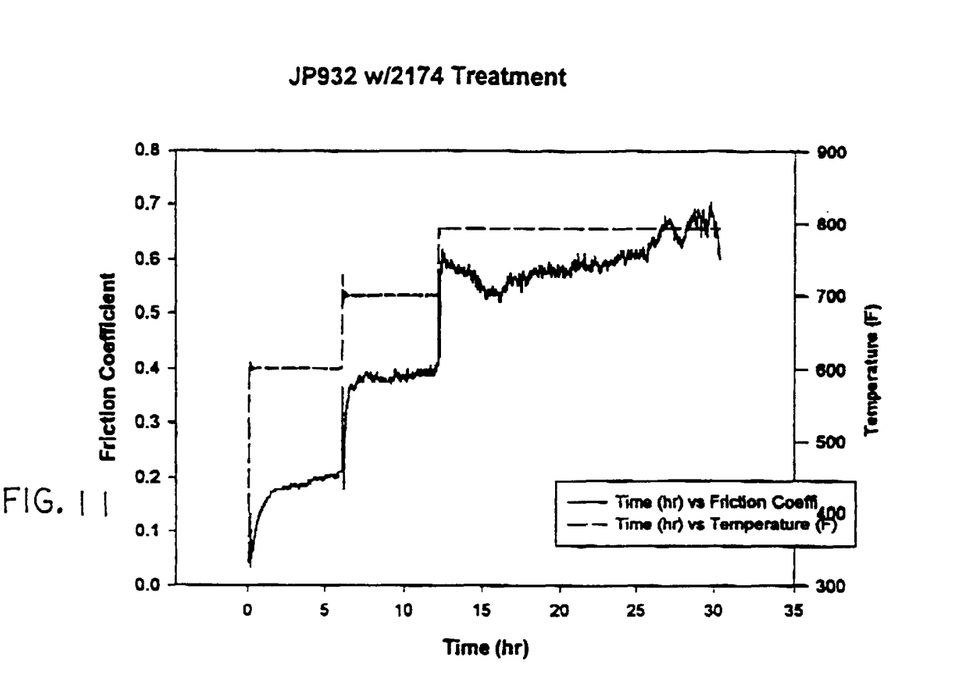
Figure 12:
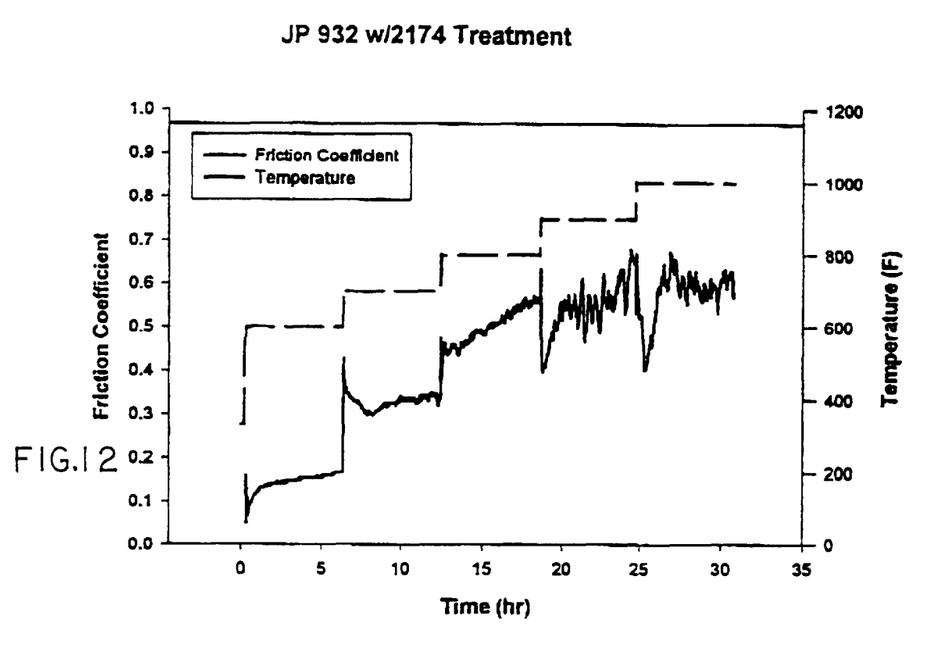

The friction and wear testing of ultra low friction carbon composites of the present invention was carried out with a high temperature sliding test machine having a single pin-on-disc geometry. The test discs used against the ultra low friction carbon composites were made of magnesium-aluminum silicate material. The test discs were 0.25 in. (6.35 mm) thick and 3 in. (76.2 mm) in diameter. For the tests, the ultra low friction carbon composite materials were cut into 12.7 mm diameter rods or discs and were used as test pins. Tests were run in open air of 20–50% relative humidity, under a load of 3.8 lbs. (17.4N). Test duration was up to 175 hours and frictional torque was monitored by a load cell and was collected by a data acquisition system throughout the tests. The rotational velocity of the sliding test was 212 rpm. The coefficient of friction of ultra low friction carbon composites of the present invention was measured in the range of 0.04–0.1 at temperatures up to approximately 1100° F. (600° C.) as shown in the graphic representations of FIGS. 2 and 3. FIGS. 4–12 are graphic representations of the variation of coefficient of friction with temperature for various other indicated carbon composite materials tested under identical conditions to those tests of the inventive material.

Table IV sets forth a comparison of the further test results of carbon/carbon panels prepared according to the present invention, with carbon/carbon panels prepared conventionally (comparative examples).

Table IV

| Test | Example 1 | Comparative Ex. 2 |
|---|---|---|
| FRICTION COEFF @ 1000° F. | 0.061 | 0.475 |
| COEFF RANGE (70–1000° F.) | 0.022–0.061 | 0.070–0.475 |
| WEAR @ 1000° F. | −0.006 | −0.017 |
| WEAR RANGE (70–1000° F.) | −0.014–0.006 | −0.195–+.003 |

Over the temperature regime tested, the coefficient of friction and wear were decreased for the inventive carbon/carbon composite component as compared to conventional carbon/carbon composites.

TABLE V

| COMPONENT | PARAMETER | Comparative Ex. 3 | Example 4 |
|---|---|---|---|
| COMPOSITE | | | |
| | FIBER VOLUME | 52.4% | 49.0% |
| | BULK DENSITY, G/CC | 1.65 | 1.72 |
| | VOIDS CONTENT | 14.4% | 12.9% |
| REINFORCEMENT | | | |
| | TYPE FIBER | T300-3K | T300-3K |
| | TYPE WEAVE | 8HS | 8HS |
| | FABRIC HEATSET TEMP. | 4350° F. | 4350° F. |
| MATRIX | | | |
| | CARBON BLACK VOL. | 10.4% | 7.3% |
| | RESIN CHAR VOL. | 11.9% | 11.7% |
| | PYROLYTIC CARBON VOL. | 11.0% | 14.1% |
| | TOTAL MATRIX CARBON VOL. | 33.3% | 33.1 % |
| | BORON CARBIDE VOL | 0.0% | 5.6% |
| | RATIO MATRIX CARBON: $B_4C$ | NA | 5.9:1 |
| | RESIDUAL $B_2O_3$ | NA | 0.0% |
| HIGH TEMP. PROCESSING | | | |
| | CARBONIZATION TEMP. | NONE | 1000° F. |
| | PYROLYSIS TEMP. | 4000° F. | 3200° F. |
| | NO. OF CVD CYCLES | 1 | 2 |
| | FRICTION COEFF. @ 1000° F. | 0.650 | 0.060 |

TABLE V-continued

| COMPONENT | PARAMETER | Comparative Ex. 3 | Example 4 |
|---|---|---|---|
| COMPONENT TEST RESULTS | | | |
| | COEFF RANGE (70–1000° F.) | 0.035–0.670 | 0.030–0.110 |
| | WEAR @ 1000° F. | −0.020 | −0.017 |
| | WEAR RANGE (70–1000° F.) | −0.020–0.000 | −0.017–0.001 |

There has thus been demonstrated ultra low friction carbon/carbon composites, and a method of preparation therefor. The carbon/carbon composite component of the present invention is adapted for high operating temperature use in a frictional operation wherein said component engages and moves relative to a body, wherein said component has a low coefficient of friction, being in a range of about 0.022 to about 0.11 within an operating temperature range of 70° F. (21° C.) to 1000° F. (535° C.); and wherein said component comprises a pyrolyzed composite of a carbon fiber reinforced densified carbon matrix, having a final fiber volume of from about 30 volume percent to about 70 volume percent, a matrix resin char content of 0 to about 20 volume percent, a matrix carbon black filler content of 0 to about 10 volume percent, a matrix pyrolitic carbon content of from about 5 to about 20 volume percent, and a final density of from about 1.6 to about 2.0 g/cc; wherein said composite contains a controlled amount of at least one of boron and an inorganic boron compound in a range of about 0.1 to about 10 volume percent.

In one embodiment, the component may be formed by impregnating a carbon fiber reinforcement material with a pre-impregnating mixture containing amounts of resin or pitch, boron or inorganic boron compound, and carbon black, sufficient to provide their respective final component contents; shaping laminated sheets of the carbon fiber reinforcement material into a component precursor before or after said impregnating; curing the component precursor; heating the component precursor in an inert atmosphere or vacuum at an elevated temperature to form a carbonized component by converting the resin or pitch to carbon, wherein the carbonized component is porous and has low density; pyrolyzing the component in an inert atmosphere or vacuum at a temperature of about 1800° F. (980° C.) to about 5000° F. (2760° C.); and, densifying the low density component by depositing pyrolytic carbon in the pores of the component before or after said pyrolyzing.

The carbon/carbon composites of the present invention exhibit coefficients of friction of about 0.022 to about 0.11, preferably about 0.03 to about 0.11, at temperatures between about 70° F. (21° C.) and about 1000° F. (535° C.), and in some embodiments, 0.04 to 0.1 at temperatures up to at least 1100° F. (600° C.). Such a low friction characteristic of carbon composites has never been reported and was heretofore unknown. The magnitude of the coefficients of friction measured for the disclosed carbon composites is one of the lowest measured by the applicants for virtually any type of carbonaceous materials including graphite, glassy carbon, diamond, diamond-like carbon, and other forms of carbon material. The exceptional slipperiness of the disclosed carbon composites make them very unique and particularly adapted for substantially reducing friction and wear at elevated temperatures. The previously unknown extremely low coefficients of friction of the disclosed carbon composites make these materials particularly useful in such wear-susceptible components as seals, bearings, shafts and flexible joints.

The carbon/carbon composites of the present invention are therefore useful for reducing friction and wear between a first moving or rotating component and a second component, where said first component engages said second component in a frictional manner, by providing either the first component and/or said second component as a low friction carbon/carbon composite as described above, such as by forming either the first component and/or said second component as a low friction carbon/carbon composite, at least in the vicinity of the interface between the components. Forming an article from the inventive carbon/carbon composites reduces the coefficient of friction of the article.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawing is offered by way of illustration only and not as a limitation. The actual scope of the invention is intended to be defined in the following claims when viewed in their proper perspective based on the prior art.

We claim:

1. A carbon/carbon composite component adapted for high operating temperature use in a frictional operation wherein said component engages and moves relative to a body, wherein said component has a coefficient of friction in a range of about 0.022 to about 0.11 within an operating temperature range of 70° F. to 1000° F.; and wherein said component comprises a pyrolyzed composite of a carbon fiber reinforced densified carbon matrix, having a final fiber volume of from about 30 volume percent to about 70 volume percent, a matrix resin char content of 0 to about 20 volume percent, a matrix carbon black filler content of 0 to about 10 volume percent, a matrix pyrolytic carbon content of from about 5 to about 20 volume percent, and a final density of from about 1.6 to about 2 g/cc; wherein said composite contains a controlled amount of at least one of boron and an inorganic boron compound in a range of about 0.1 to about 10 volume percent.

2. The component of claim 1, wherein the controlled amount of the boron or inorganic boron compound is about 5 to about 6 volume percent.

3. The component of claim 1, wherein the final fiber volume is about 45 to about 55 volume percent.

4. The component of claim 1, wherein the matrix resin char content is about 11 to about 13 volume percent.

5. The component of claim 1, wherein the matrix carbon black filler content is about 6 to about 8 volume percent.

6. The component of claim 1, wherein the matrix pyrolytic carbon content is about 13 to about 15 volume percent.

7. The component of claim 1, wherein the final fiber volume is about 45 to about 55 volume percent, the matrix resin char content is about 11 to about 13 volume percent, the matrix carbon black filler content is about 6 to about 8 volume percent and the matrix pyrolytic carbon content is about 13 to about 15 volume percent.

8. The component of claim 7, wherein the controlled amount of the boron or inorganic boron compound is about 5 to about 6 volume percent.

9. The component of claim 8, wherein the inorganic boron compound is boron carbide.

10. The component of claim 1 wherein the fiber is one of a continuous fiber cloth, a woven fabric, a yarn, and chopped fiber.

11. The component of claim 1 wherein the fiber is a carbon fiber derived from a polyacrylonitrile precursor fiber.

12. The component of claim 7, wherein the carbon fiber is a woven fabric, heatset to a temperature between about 1500° F. and 5000° F.

13. The component of claim 1, having a final density of about 1.7 to about 1.75 g/cc.

14. The component of claim 1, wherein the inorganic boron compound is boron carbide.

15. The component of claim 1 formed by:
   impregnating a carbon fiber reinforcement material with a pre-impregnating mixture containing amounts of resin or pitch, boron or inorganic boron compound, and optionally carbon black, sufficient to provide their respective final component contents;
   shaping laminated sheets of the carbon fiber reinforcement material into a component precursor before or after said impregnating;
   curing the component precursor;
   heating the component precursor in an inert atmosphere or vacuum at an elevated temperature to form a carbonized component by converting the resin or pitch to carbon, wherein the carbonized component is porous and has low density;
   pyrolyzing the component in an inert atmosphere or vacuum at a temperature of about 1800° F. to about 5000° F.; and,
   densifying the low density component by depositing pyrolytic carbon in the pores of the component before or after said pyrolyzing.

16. The component of claim 15 wherein said shaping and curing includes:
   forming said carbon fiber reinforcement material into thin sheets followed by wrapping, winding or stacking said thin sheets to form a laminate before or after said impregnating, and
   forming the impregnated laminate into the component precursor at a temperature of about 300° F. to about 400° F. and a pressure of about 100 to about 200 psi.

17. The component of claim 16 wherein said forming is at least one of autoclaving and press molding the impregnated laminate.

18. The component of claim 15, wherein said densifying said low density component includes heating said low density component in a gaseous hydrocarbon atmosphere at a temperature of about 1800° F. to about 2100° F.

19. The component of claim 15, wherein said densifying said low density component includes impregnating said low density component with a resin or pitch followed by heating said impregnated component to a temperature of about 1000° F. to about 1500° F.

20. The component of claim 19, wherein said densifying includes impregnating said low density component with phenolic resin.

21. The component of claim 15, wherein the pre-impregnating mixture contains phenolic resin.

22. The component of claim 15, wherein the pre-impregnating mixture contains carbon black.

23. The component of claim 1 in the form of at least one of a seal, a bearing, a shaft, and a flexible joint.

24. The component of claim 1 having a coefficient of friction in a range of about 0.03 to about 0.11 within an operating temperature range of 70° F. to 1000° F.

25. The component of claim 1 having a coefficient of friction of about 0.06 at an operating temperature of about 1000° F.

26. The component of claim 1 having a coefficient of friction of about 0.04 to about 0.1 at an operating temperature up to about 1100° F.

27. A method for reducing friction and wear between a first moving or rotating component and a second component, wherein said first component engages said second component in a frictional manner, which comprises:
   providing the low friction carbon/carbon composite component of claim 1 as at least one of the first component and the second component.

28. The method of claim 27 including forming at least one of the first component and said second component as the low friction carbon/carbon composite component, at least in the portion of the interface between the first and second components.

29. The method of claim 28 including forming said at least one of the first component and said second component as one of a seal, a bearing, a shaft, and a flexible joint.

30. A method for reducing the coefficient of friction of an article, comprising:
   forming the article from the carbon/carbon composite component of claim 1.

31. The component of claim 1, having a final density of about 1.7 to about 2 g/cc.

32. The component of claim 15, having a final density of about 1.7 to about 2 g/cc.

* * * * *